(12) United States Patent
Molnar et al.

(10) Patent No.: US 8,066,239 B2
(45) Date of Patent: Nov. 29, 2011

(54) INTEGRATED DIN RAIL ATTACHMENT FEATURE FOR SUPERIOR ATTACHMENT

(75) Inventors: Nathan J. Molnar, Shaker Heights, OH (US); Douglas R. Bodmann, Shaker Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 138 days.

(21) Appl. No.: 12/484,298

(22) Filed: Jun. 15, 2009

(65) Prior Publication Data

US 2010/0314522 A1 Dec. 16, 2010

(51) Int. Cl.
*A47B 96/06* (2006.01)

(52) U.S. Cl. .................... 248/214; 248/222.11; 361/732; 439/532

(58) Field of Classification Search ................. 439/532, 439/716, 953; 361/732; 248/214, 222.11, 248/222.51

See application file for complete search history.

(56) References Cited

U.S. PATENT DOCUMENTS

| | | | | |
|---|---|---|---|---|
| 4,067,529 | A | * | 1/1978 | Milcoy ................... 248/222.12 |
| 5,602,363 | A | * | 2/1997 | Von Arx ......................... 174/559 |
| 5,904,592 | A | | 5/1999 | Baran et al. |
| 5,907,476 | A | | 5/1999 | Davidsz |
| 6,146,213 | A | * | 11/2000 | Yoon ............................ 439/716 |

(Continued)

FOREIGN PATENT DOCUMENTS

DE 295 06 579 8/1995

(Continued)

OTHER PUBLICATIONS

European Search Report mailed Mar. 22, 2011, for Application No. EP 10 16 5991.

*Primary Examiner* — Terrell McKinnon
*Assistant Examiner* — Bradley Duckworth
(74) *Attorney, Agent, or Firm* — Fay Sharpe LLP; R. Scott Speroff; John M. Miller

(57) ABSTRACT

An electronics module includes a base and a cover connected to the base. The base includes a recess adapted to receive an associated mounting rail. At least one fixed rail constraining tab is located adjacent a first edge of the recess and is adapted to engage a first flange of the associated mounting rail. First and/or second latch arms are located adjacent a second edge of the recess that is opposite the first edge of the recess. The first and second latch arms are connected to a fixed portion of the second edge and project outwardly relative to opposite lateral sides of the fixed portion. Each of the first and second latch arms includes a rail capture tab. The first and second latch arms are selectively movable resiliently to and from latched and unlatched positions, wherein the rail capture tabs of the first and second latch arms project beyond the fixed portion of the second edge and into the recess when the first and second latch arms are located in their respective latched positions, and wherein the rail capture tabs of the first and second latch arms are withdrawn relative to the fixed portion of the second edge when the first and second latch arms are located in their respective unlatched positions. The cover or other portion of the module defines first and second receiving locations that receive and retain portions of the first and second latch arms when the first and second latch arms are located in their respective latched positions.

20 Claims, 8 Drawing Sheets

U.S. PATENT DOCUMENTS

| | | |
|---|---|---|
| 6,157,287 A | 12/2000 | Douglass et al. |
| 6,392,319 B1 * | 5/2002 | Zebermann et al. ........... 307/147 |
| 6,418,027 B1 * | 7/2002 | Suzuki et al. ................. 361/729 |
| 6,431,909 B1 | 8/2002 | Nolden et al. |
| 6,475,036 B2 | 11/2002 | Morikawa |
| 6,543,957 B1 * | 4/2003 | Raspotnig .................... 403/286 |
| 6,563,697 B1 | 5/2003 | Simbeck et al. |
| 6,935,903 B2 | 8/2005 | Gaidosch |
| 7,059,898 B2 | 6/2006 | Barile |
| 7,758,368 B2 * | 7/2010 | Schelonka et al. ............ 439/325 |
| 2010/0216334 A1 * | 8/2010 | Christmann et al. .......... 439/532 |
| 2010/0255713 A1 * | 10/2010 | Peng ............................. 439/532 |
| 2010/0285690 A1 * | 11/2010 | Molnar ......................... 439/532 |

FOREIGN PATENT DOCUMENTS

| | | |
|---|---|---|
| DE | 100 12 764 A1 | 9/2001 |
| DE | 197 48 530 B9 | 9/2004 |
| EP | 0 300 065 | 7/1987 |
| EP | 1 833 132 | 9/2007 |
| GB | 2 305 784 | 4/1997 |

* cited by examiner

US 8,066,239 B2

INTEGRATED DIN RAIL ATTACHMENT FEATURE FOR SUPERIOR ATTACHMENT

BACKGROUND

It is known to provide an electronics module with an attachment feature for releasably securing the module to a DIN rail, which is an industry standard mounting structure. Known DIN rail attachment features include one or more latches that are manufactured separately from the electronics module and that are movably connected to the module. After being assembled to the module, such latches are manually slidable or otherwise movable between an unlatched position, for connecting/disconnecting the module to/from the DIN rail, and a latched position for fixedly securing the module to the DIN rail. This type of attachment feature is generally effective, but requires the latch(es) to be separately constructed (e.g., injection molded) and then assembled to the module, which increases product cost. In other prior devices, the electronics module includes a base, and a latch is connected to the base as a one-piece molded polymeric construction, wherein one or more flexible webs or members interconnect the latch to the base and accommodate movement of the latch between its unlatched and latched positions. These above-mentioned prior attachment features have not provided sufficient redundant latching, have not provided enough resistance to unlatching in harsh conditions and/or have otherwise been deemed suboptimal.

In light of the foregoing, a need has been identified for an electronics module including an improved DIN rail attachment feature that is defined as a one-piece construction with a base of the module and that provides for redundant latching, superior latching strength, ease of use, and other desirable features and advantages.

SUMMARY

In accordance with one aspect of the present development, a base for an electronics module includes a main wall and a recess defined in a rear face of the main wall. The recess is adapted to receive at least one flange of an associated mounting rail. At least a first movable latch arm is located adjacent the recess and includes a rail capture tab that projects from a first part of the first latch arm. The first latch arm is selectively movable between a latched position and an unlatched position, wherein the rail capture tab is withdrawn relative to the recess when the first latch arm is in its unlatched position and wherein the rail capture tab projects into the recess when the latch arm is in its latched position.

In accordance with another aspect of the present development, an electronics module includes a base and a cover connected to the base. The base includes a recess adapted to receive an associated mounting rail. At least one fixed rail constraining tab is located adjacent a first edge of the recess and is adapted to engage a first flange of the associated mounting rail. First and second latch arms are located adjacent a second edge of the recess that is opposite the first edge of the recess. The first and second latch arms are connected to a fixed portion of the second edge and project outwardly relative to opposite lateral sides of the fixed portion. Each of the first and second latch arms includes a rail capture tab. The first and second latch arms are selectively movable resiliently to and from latched and unlatched positions, wherein the rail capture tabs of the first and second latch arms project beyond the fixed portion of the second edge and into the recess when the first and second latch arms are located in their respective latched positions, and wherein the rail capture tabs of the first and second latch arms are withdrawn relative to the fixed portion of the second edge when the first and second latch arms are located in their respective unlatched positions. The cover defines first and second receiving locations that receive and retain portions of the first and second latch arms when the first and second latch arms are located in their respective latched positions.

In accordance with another aspect of the present development, a base for an electronics module includes a main wall and a recess defined in a rear face of the main wall. The recess is adapted to receive first and second flanges of an associated mounting rail. A first rail-constraining tab is located on a first side of the recess. First and second movable latch arms are located on a second side of the recess that is opposite the first side of the recess. Each of the first and second latch arms includes a rail capture tab that projects from a first part of the latch arm and each of said first and second latch arms is selectively resiliently movable between a latched position and an unlatched position, wherein the rail capture tabs of the first and second latch arms are withdrawn relative to said second side of said recess when the first and second latch arms are in their respective unlatched positions and wherein the rail capture tabs of the first and second latch arms are extended relative to the second side of the recess so as to project into the recess when the first and second latch arms are in their respective latched positions.

DETAILED DESCRIPTION

Figure 1:
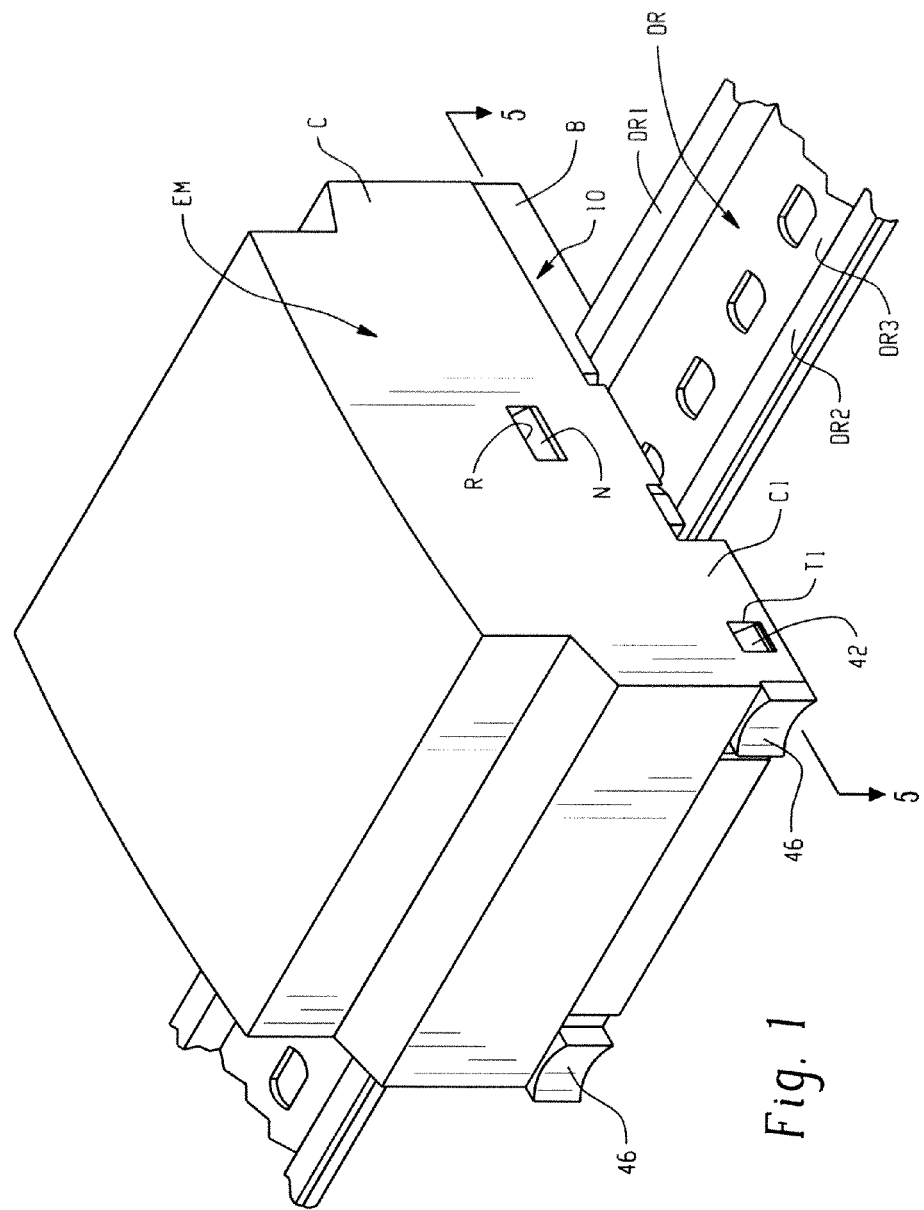
FIG. 1 is a front isometric view of an electronics module including attachment features in accordance with the present development, operatively mounted on a conventional DIN rail.
Figure 2:
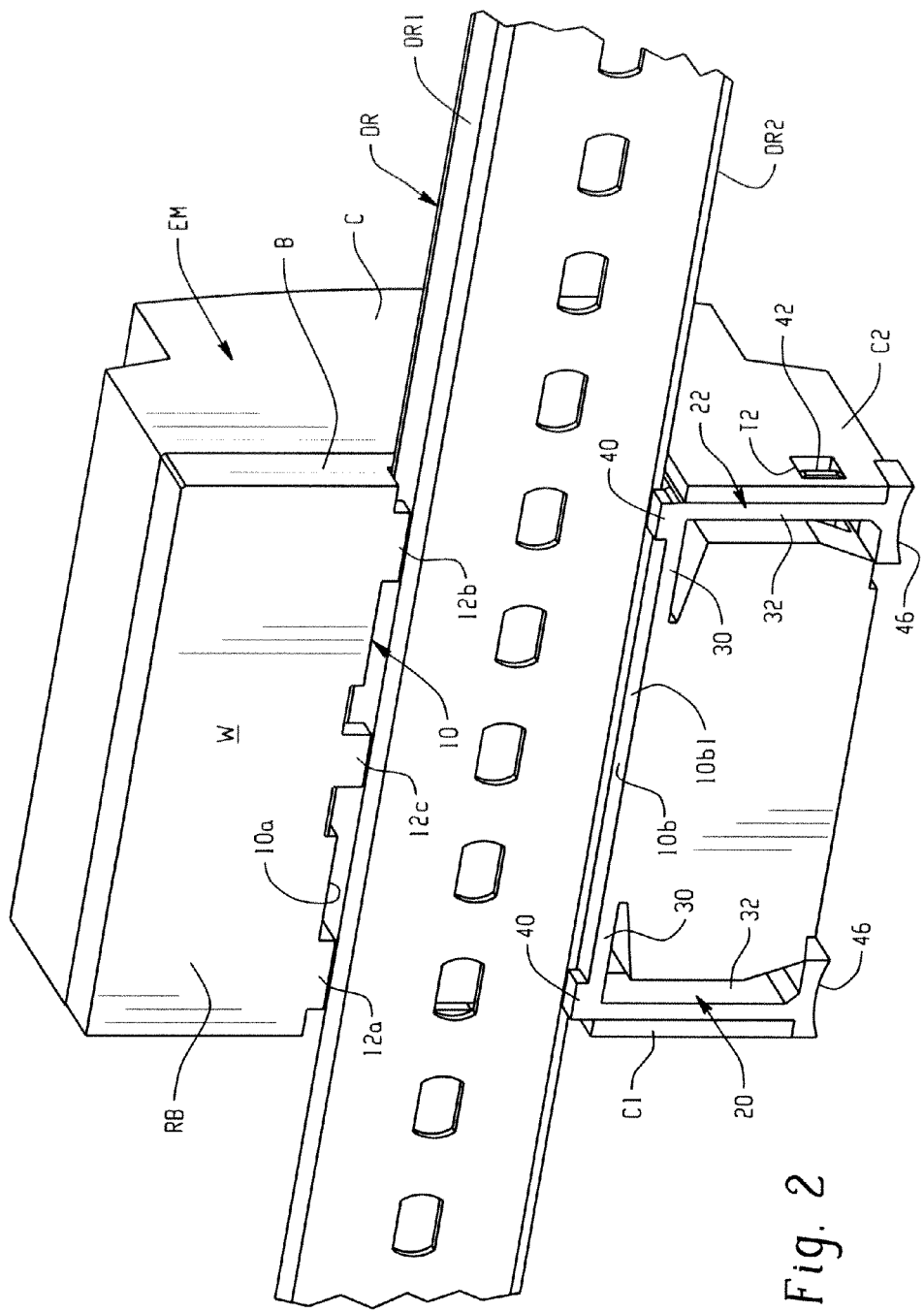
FIG. 2 is a rear isometric view similar to FIG. 1.
Figure 3A:
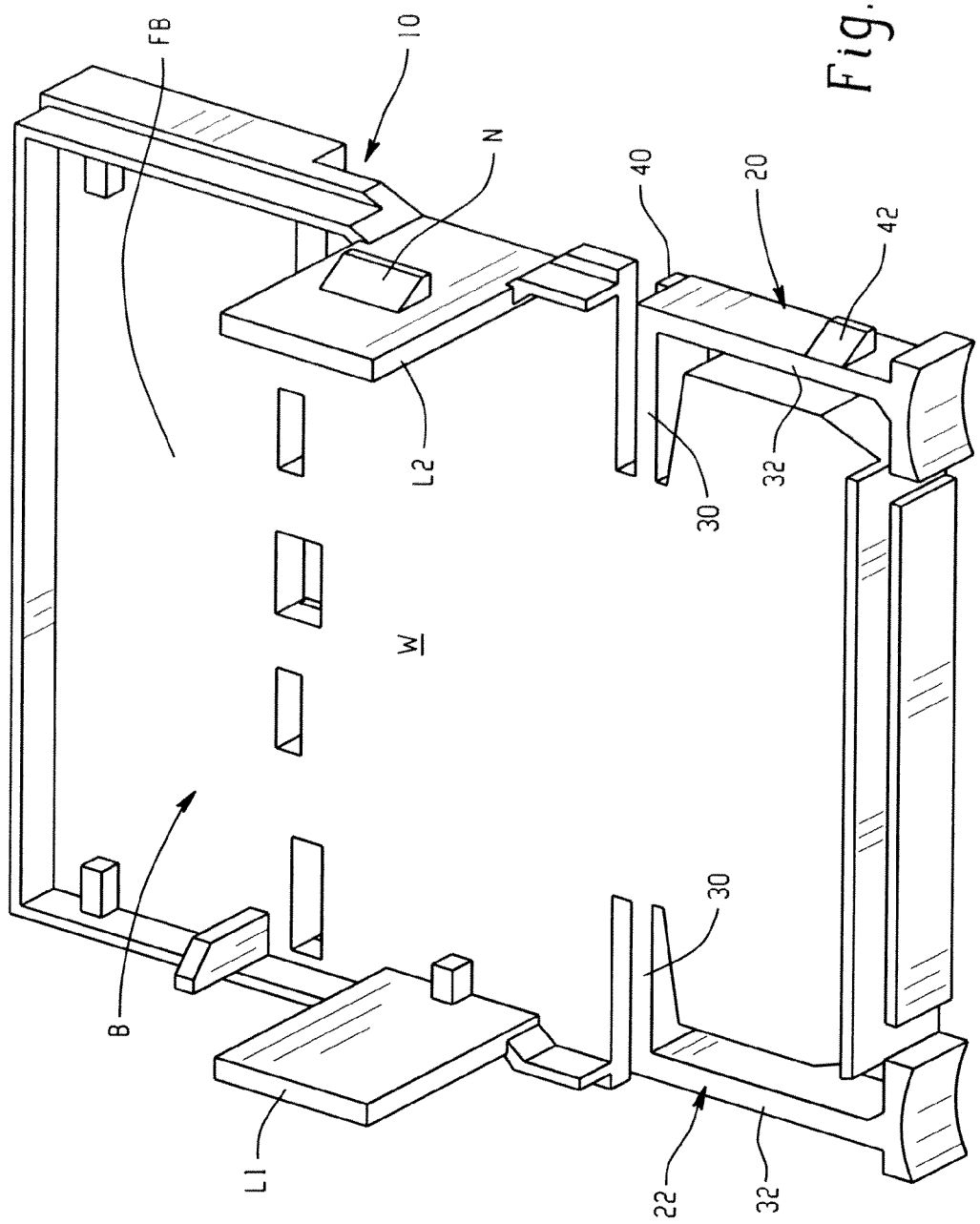
FIG. 3A is a front isometric view of the base portion of the electronics module of FIG. 1.
Figure 3B:
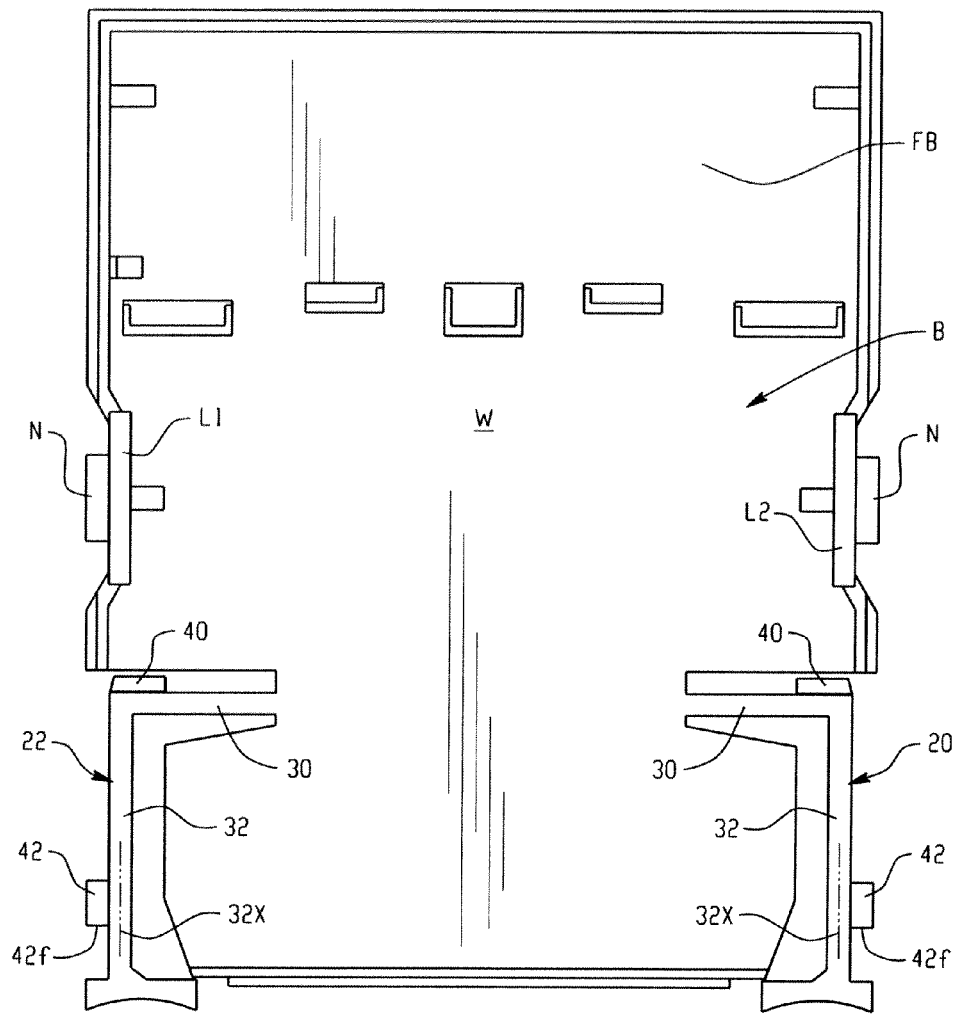
FIG. 3B is a front view of the base portion of the electronics module of FIG. 1.

FIG. 1 shows a conventional DIN rail mounting structure DR including first and second flanges DR1,DR2 connected to opposite side of a recessed central portion DR3. An electronics module EM includes DIN rail attachment features in accordance with the present development, wherein the DIN rail attachment features provide means for releasably connecting the module EM to the DIN rail DR. Referring also to the rear view of FIG. 2, the electronics module EM includes a base B for supporting one or more electronic circuit boards or other electronic components, and a cover C that is connected to the base B for enclosing the electronic components connected to the base B. In the illustrated example, the base B (shown by itself in FIGS. 3A and 3B) includes first and second legs L1,L2 that are received within the cover C and that include respective nibs N that engage mating apertures or other regions R of the cover C with a releasable snap fit.

Referring also to FIGS. 3A, 3B, 4A, 4B, the base B is defined as a one-piece molded polymeric or "plastic" construction, and the attachment features are defined as part of the one-piece construction of the base B. The base B comprises a main wall W. A first side of the main wall W defines a front face FB of the base and a second side of the main wall W defines a rear face RB of the base. A recess 10 is defined in the rear face of the base RB and opens through the opposite lateral sides of the base B and is adapted to receive the flanges DR1,DR2 of the DIN rail for mounting the module EM to the DIN rail DR. The main wall W that extends in a plane parallel to the plane in which the DIN rail flanges DR1,DR2 extend when the base B is operatively mounted to the DIN rail DR.

Figure 4A:
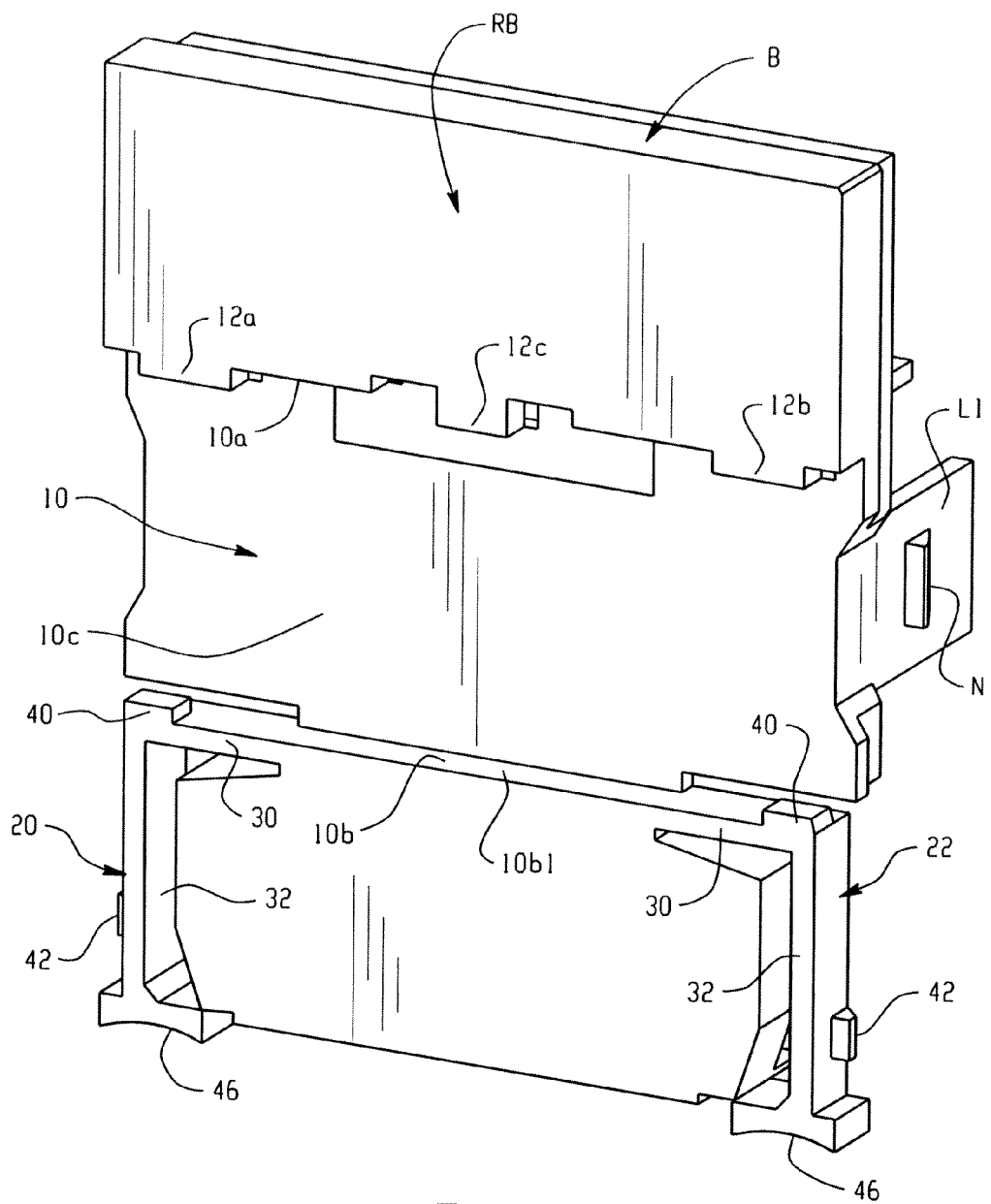
FIGS. 4A and 4B are rear isometric views of the base portion of the electronics module by itself and mounted on an associated DIN rail, respectively.

With specific reference to FIG. 4A, the recess 10 comprises first (upper) and second (lower) sides/edges 10a,10b that are located on opposite sides of its recessed/depressed inner wall or face 10c. At least one fixed rail-constraining tab, and preferably at least two laterally spaced-apart fixed rail-constraining tabs 12a,12b project into the recess 10 from the first edge 10a inwardly toward the opposite second edge 10b. The tabs 12a,12b are preferably located respectively adjacent first and second lateral sides of the base B. As shown, a third fixed rail constraining tab 12c is centrally located between the first and second tabs 12a,12b. Although not preferred, the central, third rail-constraining tab 12c could be the only rail-constraining tab provided.

The second edge 10b of the recess 10 comprises a fixed central portion 10b1. At least one, and preferably first and second latch arms 20,22 are defined as part of the base B (i.e., as part of the molded polymeric one-piece construction of the base B) and project outwardly from opposite sides of the fixed portion 10b1. As such, the first and second latch arms 20,22 are located adjacent the second edge 10b of the recess 10. The first and second latch arms 20,22 lie completely or at least substantially in the plane of the main wall W and each include a first part 30 connected to and extending laterally outward from the fixed central portion 10b1 and a second part 32 projecting transversely from the first part 30 away from the recess 10. The first and second parts 30,32 each define an L-shape (such as the inverted L-shape shown herein). Except where connected to the fixed portion 10b1 of the second edge 10b, the first and second latch arms 20,22 are spaced from and resilient movable relative to the wall W. In an alternative embodiment, the first and/or second latch arms 20,22 are defined separately from and assembled to the base B.

The latch arms 20,22 include respective rail capture tabs 40 that project outwardly from their first parts 30 generally in the direction toward the first edge 10a of the recess 10 and include respective locking tabs 42 that project laterally outward from their second parts 32. The locking tabs 42 project outwardly away from each other in opposite directions. As such, the rail capture tab 40 and locking tab 42 of each latch arm project or extend in transverse directions relative to each other. For each latch arm 20,22, it is preferred that at least part of the rail capture tab 40 be aligned with and overlap the second part 32 of the latch arm (i.e., be at least partially aligned with the longitudinal axis 32X of the second part 32) so that the second part 32 of each latch arm acts as a support column aligned with the rail capture tab 40 to counteract forces exerted on the rail capture tab 40 when the electronics module EM is operatively installed on a DIN rail.

The respective distal ends of the latch arms 20,22 each include an enlarged foot 46 that defines a T-shape (as shown) or L-shape or other enlarged structure relative to the second part 32 of the latch arm. Each foot 46 is conformed and dimensioned to provide a surface by which a user can use his/her thumbs or fingers or other means for exerting manual force on the latch arm 20,22 to move the latch arm 20,22 from its unlatched position to its latched position or vice versa.

Figure 4B:
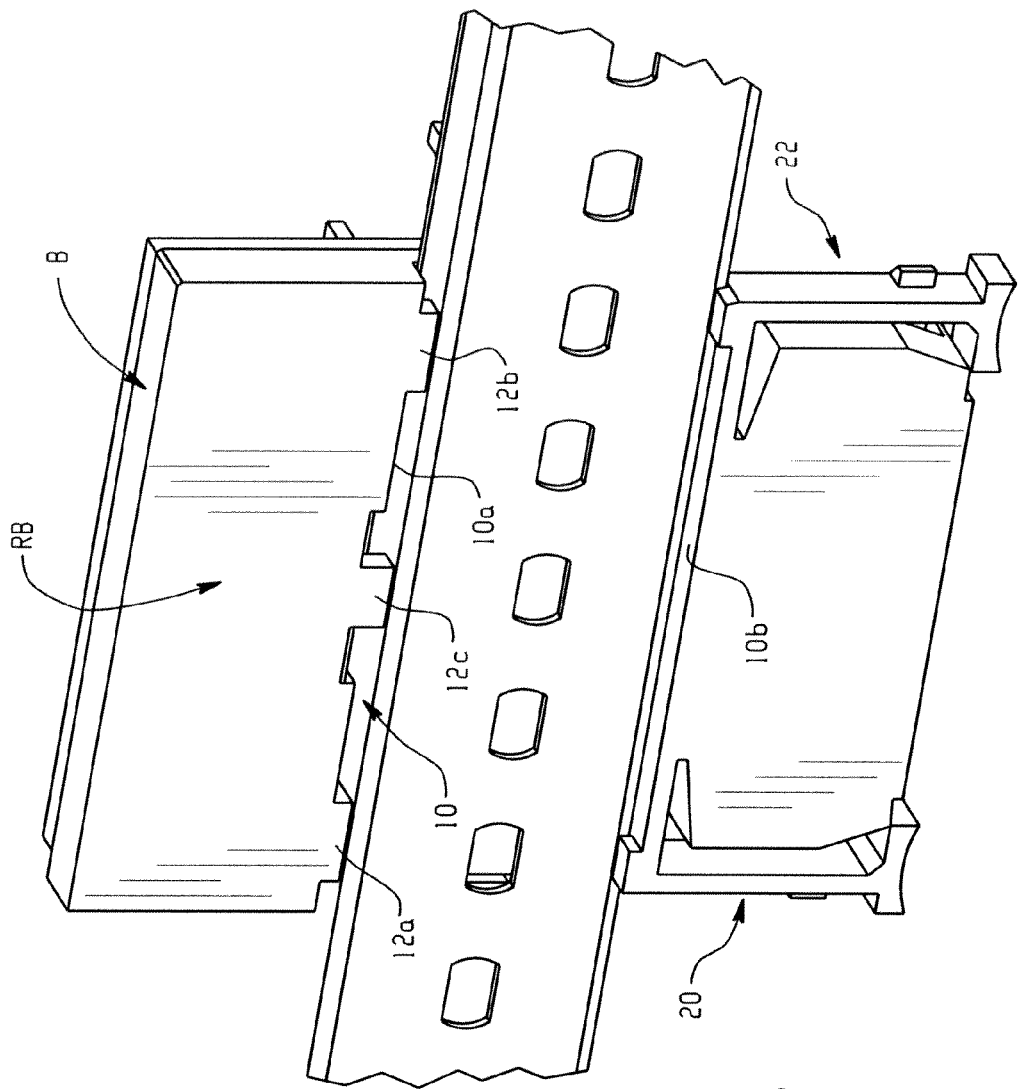

In the illustrated embodiment, the free or neutral state of the latch arms 20,22 (the position in which they are molded as part of the base B) is the latched position, where the rail capture tabs 40 thereof extend beyond the fixed portion 10b1 of the second edge 10b and into the recess 10 and are thus located to capture the second DIN rail flange DR2 in the recess (see FIG. 4B). As shown in FIG. 5B, the latch arms 20,22 are selectively resiliently and elastically movable by application of manual force to their feet 46 to their respective unlatched positions by movement of the latch arms 20,22 in the plane of the main wall W (or a plane parallel to the plane of the main wall W) away from the recess 10 so that the rail capture tabs 40 thereof a withdrawn relative to the fixed portion 10b1 of the second edge 10b and do not project into the recess 10. When the latch arms 20,22 are in their unlatched positions (FIG. 5B), the rail capture tabs 40 thereof do not capture the DIN rail second flange DR2 in the recess 10.

In an alternative embodiment, the first and second latch arms 20,22 are defined so that their free or neutral position is the unlatched position (or a position between the latched and unlatched positions).

Figure 5A:
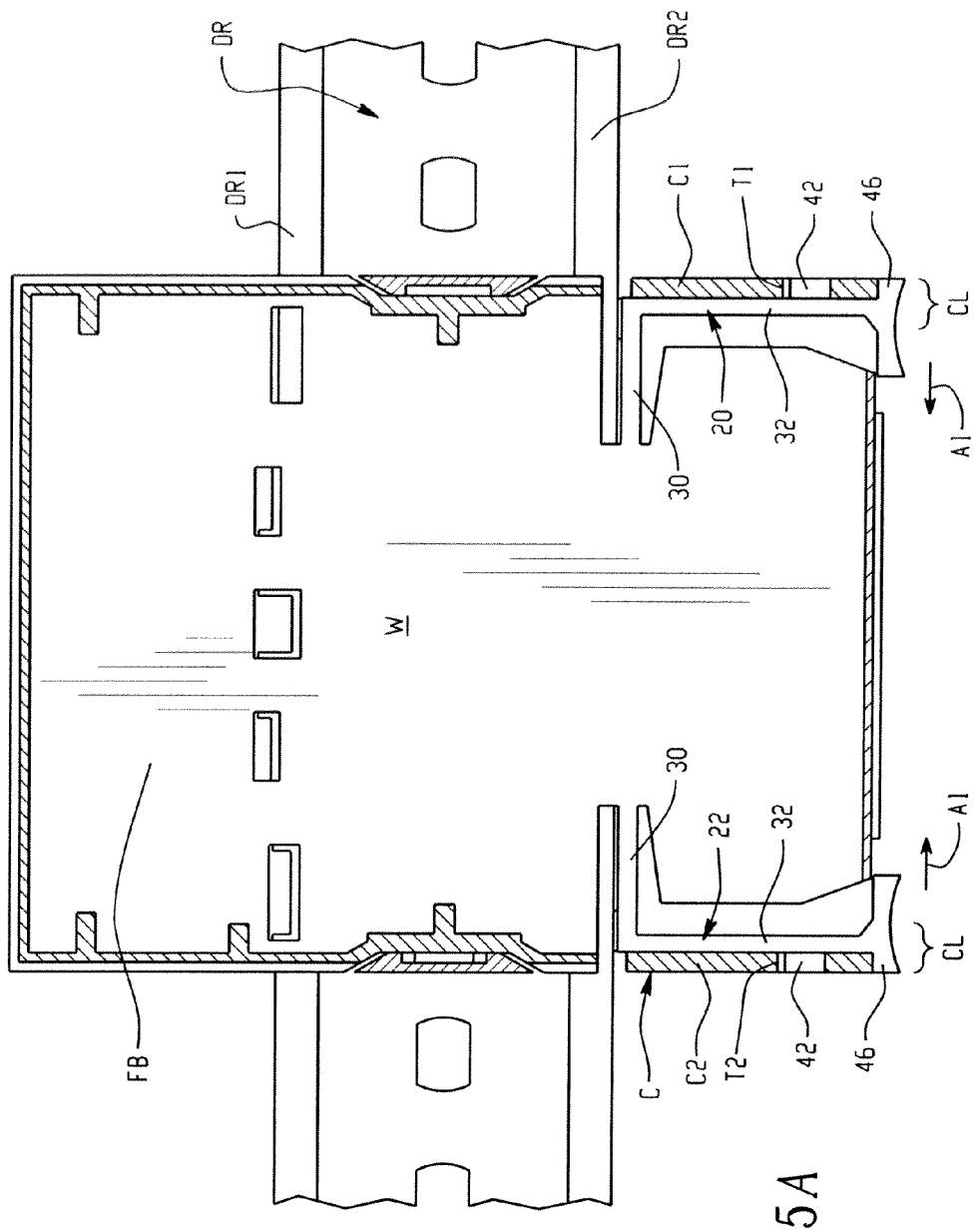
FIGS. 5A and 5B are section views of the electronics module of FIG. 1 as taken at line 5-5 of FIG. 1, respectively showing the module latched (FIG. 5A) and unlatched (FIG. 5B) relative to the associated DIN rail.
Figure 5B:
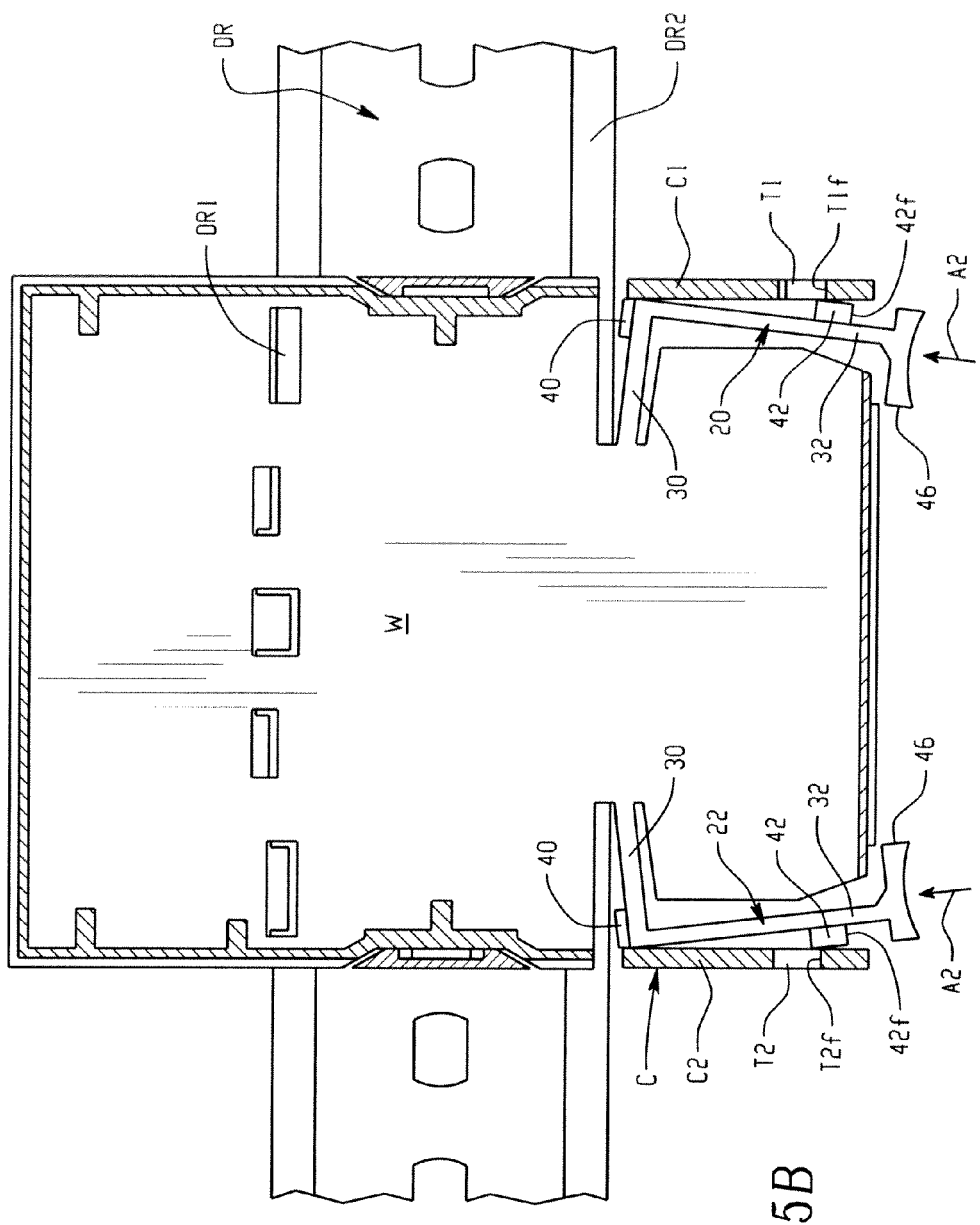

FIGS. 5A and 5B are section views of the electronics module of FIG. 1 as taken at line 5-5 of FIG. 1, respectively showing the module latched (FIG. 5A) and unlatched (FIG. 5B) relative to the associated DIN rail DR. Referring to all of FIGS. 1, 2, 5A and 5B, it can be seen that the cover C of the electronics module EM includes or defines first and second locking tab receiving locations T1,T2 in which the locking tabs 42 are received and retained when the first and second latch arms 20,22 are located in their respective latched positions (FIG. 5A). A user can selectively apply manual force to the feet 46 as indicated by the arrows A1 (FIG. 5A) to move the feet 46 toward each other so that the locking tabs 42 are withdrawn from the locations T1,T2 and so that the latch arms 20,22 can be resiliently and elastically moved to their respective unlatched positions (FIG. 5B). As shown in FIG. 5B, the cover C engages the locking tabs 42 and/or other portions of the latch arms 20,22 to inhibit the latch arms 20,22 from naturally resiliently moving back to their respective latched positions. When a user desires to move the latch arms 20,22 back to their latched positions, the user exerts manual force on the feet 46 as indicated by the arrows A2 (FIG. 5B) so that the latch arms 20,22 move resiliently to their respective latched positions and so that the locking tabs are once again received and retained in the locking tab receiving locations T1,T2.

As shown, the first and second locking tab receiving locations T1,T2 are defined as apertures that open through the cover C, but they could be defined as respective recesses or any other structures or locations of the cover adapted to receive and retain the locking tab 42 of the latch arms 20,22. In an alternative embodiment, the locking tabs 42 are received in respective apertures, recesses or other receiving locations defined by another part of the electronics module instead of the cover, e.g., part of the base B, itself. In still another alternative embodiment, the feet 46 or other portion of the first and second latch arms include or define the locking tabs that are adapted to be selectively received and retained in a receiving location such as the locations T1,T2 defined by the cover or by the alternative receiving locations defined by the base B or other portion of the electronics module EM.

The first and second locking tab receiving regions T1,T2 are defined in respective cover wall portions C1,C2 that are arranged transverse and preferably perpendicular to the main wall W of the base B, which allows for enhanced engagement of the locking tabs 42 in the tab receiving regions T1,T2. Also, it is preferred that the locking tabs 42 include respective lock faces 42f that extends perpendicular relative to the respective latch arm second parts 32, i.e., perpendicular to the respective longitudinal axes 32X (FIG. 3B) of the respective second parts 32, and also that the tab receiving region T1,T2 include respective catch faces T1*f*,T2*f* that are defined perpendicular to the plane in which the cover wall portions C1,C2 extend, so that when the locking tabs 42 are received in the respective tab receiving region T1,T2, the lock faces 42*f* mate with the respective catch faces T1*f*,T2*f* so that the locking tabs 42 are resistant to dislodgement from the tab receiving regions T1,T2 in response to forces coincident with the longitudinal axes 32X of the respective second parts 32 of the latch arms 20,22.

Use of the first and second latch arms 20,22 to operably connect the electronics module EM to an associated DIN rail is described with reference to FIGS. 5A and 5B. To operably connect the module EM to an associated DIN rail DR, the first and second latch arms must be located in their unlocked/unlatched positions as shown in FIG. 5B. The recess 10 of the module EM is moved into engagement with the rail DR so that the first DIN rail flange DR1 is received in the recess 10 adjacent the first side 10*a* of the recess and received behind/under the rail-constraining tabs 12*a*,12*b*,12*c*, and so that the second DIN rail flange DR2 is located adjacent the fixed portion 10*b*1 of the second side 10*b* of the recess, with both DIN rail flanges DR1,DR2 being abutted with the recess inner wall 10*c* as shown in FIG. 5B. Thereafter, manual force in the direction of the arrows A2 is exerted on the feet 46 of the latch arms 20,22 to move the latch arms to their respective locked/latched positions as shown in FIG. 5A (and also FIGS. 1 and 2) so that the locking tabs 42 of the first and second latch arms 20,22 move into and are retained in the respective locking tab receiving locations T1,T2 of the cover C. As noted, when the first and second latch arms 20,22 are located in their latched positions, the rail-constraining tabs 40 thereof project beyond the fixed portion 10*b*1 of the second side 10*b* of the recess 10 and into the recess 10 so as to capture the second DIN rail flange DR2 in the recess 10. Engagement of the locking tabs 42 in the respective first and second tab receiving locations T1,T2 of the cover C prevents the first and second latch arms 20,22 from returning to their unlatched positions due to impact or other forces exerted on the electronics module EM or DIN rail DR. When the latch arms 20,22 are in their latched positions, the second parts 32 thereof are abutted with respective portions C1,C2 of the cover C and lie parallel to each other. The latch arm second parts 32 and the respective cover wall portions C1,C2 abutted therewith define respective support columns CL1,CL2 that are respectively aligned with at least part of the rail capture tabs 40 of the first and second latch arms 20,22 to resist forces exerted on the respective latch arms 20,22 to prevent undesired movement of the latch arms 20,22 from their latched positions to their unlatched positions.

When it is deemed desirable to remove the electronics module EM from the associated DIN rail DR, the above steps are reversed. This requires that the user manually disengage the locking tabs 42 from their respective receiving locations T1,T2. This can be accomplished by user application of force to the latch arm feet 46 in an inward direction (so that the feet are moved toward each other) as indicated by the arrows A1, which will disengage the locking tabs 42 from the locations T1,T2 so that the first and second latch arms 20,22 can be moved resiliently to their unlatched positions. Alternatively, if the locking tab receiving locations T1,T2 open through the cover C as shown herein, the user can use a tool to force the locking tabs 42 inward to release same from the respective receiving location T1,T2.

The development has been described with reference to preferred embodiments. Those of ordinary skill in the art will recognize that modifications and alterations to the preferred embodiments are possible. The disclosed preferred embodiments are not intended to limit the scope of the following claims, which are to be construed as broadly as possible, whether literally or according to the doctrine of equivalents.

The invention claimed is:

1. A base for an electronics module, said base comprising:
   a main wall;
   a recess defined in a rear face of the main wall, said recess adapted to receive at least one flange of an associated mounting rail;
   first and second movable latch arms located adjacent the recess, each of said first and second latch arms including a rail capture tab that projects from a first part of the latch arm, each of said first and second latch arms further including a second part that extends transversely from said first part so as to define an L-shape;
   wherein, for each of said first and second latch arms, at least part of the respective rail capture tab of the latch arm is aligned with a longitudinal axis of the second part of the latch arm;
   each of said first and second latch arms selectively resiliently movable between a latched position and an unlatched position, wherein the rail capture tabs of the first and second latch arms are withdrawn relative to the recess when the first and second latch arms are in their respective unlatched positions and wherein the rail capture tabs of the first and second latch arms are extended relative to the recess so as to project into the recess when the first and second latch arms are in their respective latched positions; and
   wherein said first and second latch arms and said main wall of said base are defined as a one-piece molded polymeric construction.

2. The base for an electronics module as set forth in claim 1, wherein a portion of the first latch arm is received and retained by a first receiving location when the first latch arm is located in its latched position to inhibit movement of the first latch arm from its latched position to its unlatched position.

3. The base for an electronics module as set forth in claim 1, wherein the respective first part of each of the first and second latch arms extend from the main wall in opposite directions in a common plane.

4. The base for an electronics module as set forth in claim 3, wherein the respective second parts of each of the first and second latch arms extend from the respective first parts of each of the first and second latch arms in a common direction and in a common plane.

5. The base for an electronics module as set forth in claim 1, wherein the respective first part of each of the first and second latch arms are coplanar with at least a portion of the main wall.

6. A base for an electronics module, said base comprising:
   a main wall;
   a recess defined in a rear face of the main wall, said recess adapted to receive at least one flange of an associated mounting rail;
   at least a first movable latch arm located adjacent the recess, the first latch arm including a rail capture tab that projects from a first part of the first latch arm, said first latch arm selectively movable between a latched position and an unlatched position, wherein the rail capture tab is withdrawn relative to said recess when the first latch arm is in its unlatched position and the rail capture tab projects into the recess when the latch arm is in its latched position, and wherein a portion of the first latch arm is received and retained by a first receiving location when the first latch arm is located in its latched position to inhibit movement of the first latch arm from its latched position to its unlatched position; and a cover defined separately from the base and connected to the base, said cover comprising said first receiving location such that said first latch arm is retained in its latched position by said engagement with said cover.

7. The base for an electronics module as set forth in claim 6, wherein the first latch arm includes a first locking tab that projects therefrom, and wherein said first receiving location receives and retains the first locking tab when the first latch arm is located in its latched position.

8. The base for an electronics module as set forth in claim 7, wherein said first latch arm further includes a second part that extends transversely from said first part so as to define an L-shape, and wherein the first locking tab is connected to the second part.

9. The base for an electronics module as set forth in claim 8, wherein at least part of the rail capture tab is aligned with a longitudinal axis of the second part of the latch arm.

10. The base for an electronics module as set forth in claim 9, wherein the latch arm second part includes an enlarged foot adapted for user application of manual force to the first latch arm.

11. The base for an electronics module as set forth in claim 6, wherein said base is defined as a one-piece molded polymeric construction.

12. The base for an electronics module as set forth in claim 11, wherein the first latch arm moves resiliently and elastically between its latched and unlatched positions.

13. An electronics module comprising:
a base and a cover connected to the base;
said base comprising:
a recess adapted to receive an associated mounting rail;
at least one fixed rail constraining tab located adjacent a first edge of the recess and adapted to engage a first flange of the associated mounting rail;
first and second latch arms located adjacent a second edge of the recess that is opposite the first edge of the recess, said first and second latch arms connected to a fixed portion of said second edge and projecting outwardly relative to opposite lateral sides of the fixed portion, each of said first and second latch arms comprising a rail capture tab, said first and second latch arms selectively movable resiliently to and from latched and unlatched positions, wherein said rail capture tabs of the first and second latch arms project beyond the fixed portion of the second edge and into the recess when the first and second latch arms are located in their respective latched positions, and wherein the rail capture tabs of the first and second latch arms are withdrawn relative to said fixed portion of the second edge when the first and second latch arms are located in their respective unlatched positions;

wherein said cover defines first and second receiving locations that respectively receive and retain portions of the first and second latch arms when the first and second latch arms are located in their respective latched positions.

14. The electronics module as set forth in claim 13, wherein the first and second latch arms comprise respective locking tabs that are respectively received in the first and second receiving locations of the cover when the first and second latch arms are located in their respective latched positions.

15. The electronics module as set forth in claim 14, wherein said first and second receiving locations of said cover are defined by respective apertures that extend through said cover.

16. The electronics module as set forth in claim 14, wherein each of said first and second latch arms is L-shaped, and wherein the rail capture tab is connected to a first part of the latch arm and the locking tab is connected to a second part of the latch arm that extends transversely from the first part of the latch arm, for both said first and second latch arms.

17. The electronics module as set forth in claim 16, wherein the respective second parts of the first and second latch arms are arranged in parallel spaced-apart relation relative to each other when the first and second latch arms are located in their respective latched positions.

18. The electronics module as set forth in claim 17, wherein the respective second parts of the first and second latch arms are abutted with respective first and second portions of the cover to define first and second columns, wherein the first and second columns are respectively aligned with at least part of the rail capture tabs of the first and second latching arms and resist movement of the first and second latch arms from their respective latched positions to their respective unlatched positions.

19. The electronics module as set forth in claim 18, wherein said base is defined as a one-piece polymeric construction.

20. The electronics module as set forth in claim 19, wherein said first and second latch arms are defined to be located in their respective latched positions when in a free state.

* * * * *